United States Patent Office 3,589,925
Patented June 29, 1971

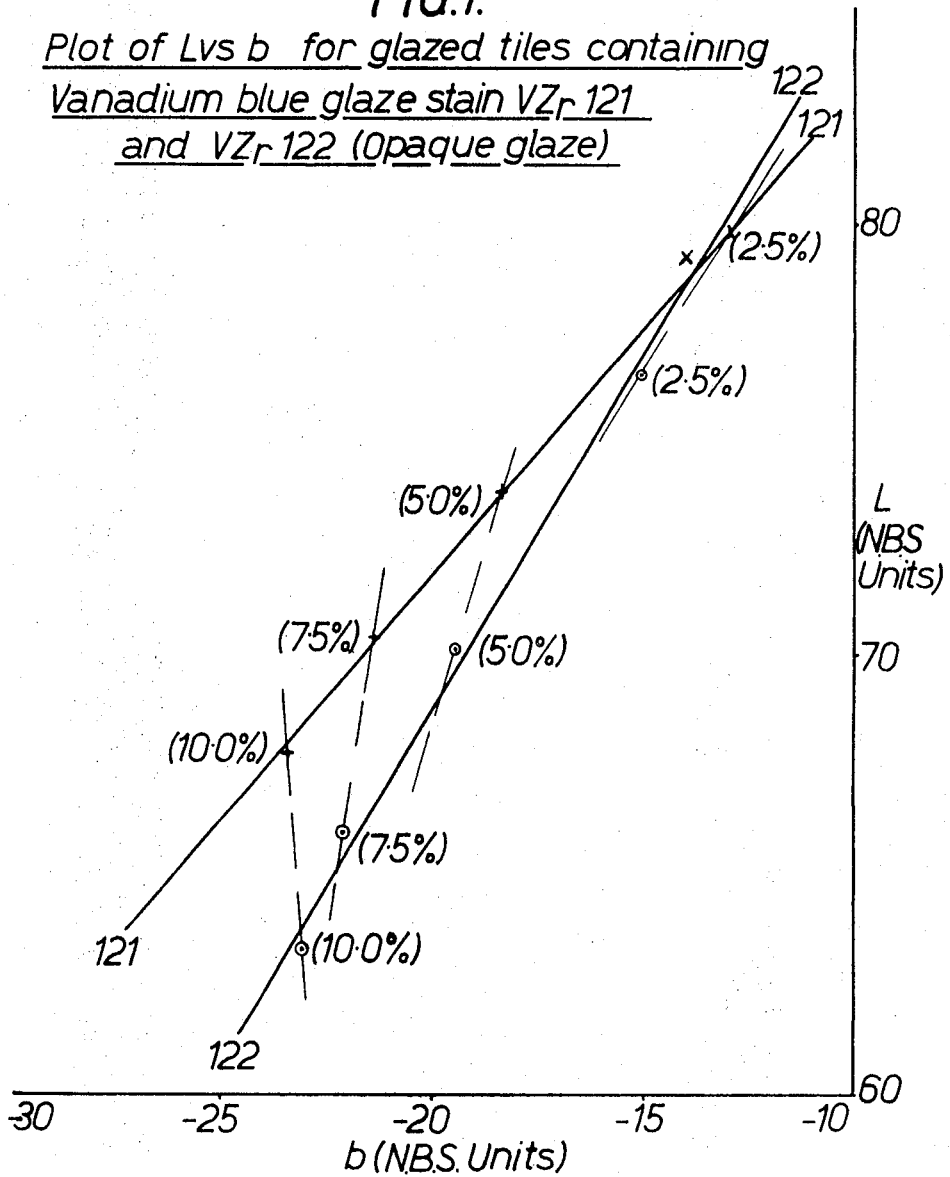

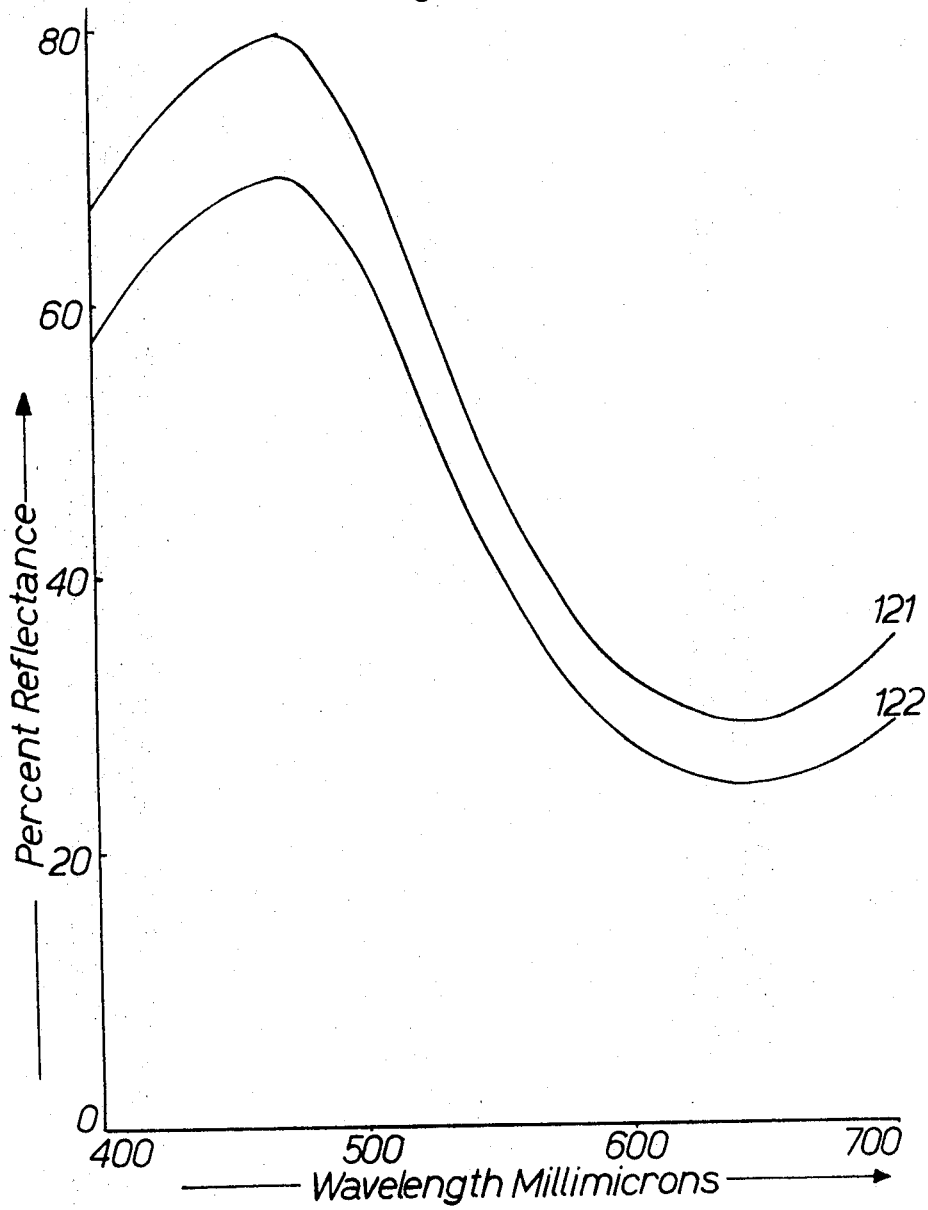

3,589,925
CERAMIC PIGMENTS
Bernard Trevor Bell, Trentham, Stoke-on-Trent, England, assignor to Johnson, Matthey & Co. Limited, London, England
Filed Dec. 22, 1967, Ser. No. 693,026
Claims priority, application Great Britain, Dec. 22, 1966, 57,441/66
Int. Cl. C09c 1/28
U.S. Cl. 106—299                                     11 Claims

ABSTRACT OF THE DISCLOSURE

The invention relates to ceramic pigments. Zircon based ceramic pigments may be prepared by calcining mixtures comprising zirconium and silicon oxide (or compounds capable of yielding these materials on calcination) in the presence of a chromophore and one or more mineralizer components, the proportions of zirconium oxide and silica in the mixture being such that zirconium silicate is formed on calcination.

It is known, for example, that blue and yellow pigments may be formed by calcining mixtures of the type described above in which the colouring agents are, respectively, vanadium pentoxide and praseodymium oxide and in which, in each case, mineralizer components comprising sources of alkali metal ions, fluoride ions and either chloride or bromide ions are employed.

We have now discovered that ceramic pigments of still further enhanced colour strength may be formed by calcining mixtures of the type described above, in which the mineralizer components comprise, a source of barium ions, in addition to sources of alkali metal ions, fluoride ions and either chloride or bromide ions.

---

The invention relates to ceramic pigments.

Zircon based ceramic pigments may be prepared by calcining mixtures comprising zirconium and silicon oxide (or compounds capable of yielding these materials on calcination) in the presence of a chromophore and one or more mineralizer components, the proportions of zirconium oxide and silica in the mixture being such that zirconium silicate is formed on calcination.

A chromophore is a material one or more components of which imparts colour to the calcined material. For example, the chromophores in blue and yellow zircon based ceramic pigments are the oxides of vanadium and praseodymium respectively. Compounds which yield such oxides on calcination are often employed in the calcination mixture.

It is known that zirconium silicate containing at least part of the chromophore is formed when mixtures of the above type are calcined. The colour strength of the ceramic pigment obtained is dependent on the relative amount of chromophore incorporated in the zircon lattice. This in turn is dependent upon the mineralizer component or components used in the calcination mixture.

It is known, for example, that strongly coloured blue and yellow pigments may be formed by calcining mixtures of the type described above in which the colouring agents are, respectively, vanadium pentoxide and praseodymium oxide and in which, in each case, mineralizer components comprising sources of alkali metal ions, fluoride ions and either chloride or bromide ions are employed.

We have now discovered that ceramic pigments of still further enhanced colour strength may be formed by calcining mixtures of the type described above, in which, the mineralizer components comprise, a source of barium ions, in addition to sources of alkali metal ions, fluoride ions and either chloride or bromide ions.

In particular, we have discovered that a strongly blue-coloured ceramic pigment may be prepared by calcining a mixture consisting essentially of zirconium and silicon oxides, one or more compounds capable on calcination of yielding vanadium pentoxide and compounds which constitute sources of alkali metal ions, barium ions, fluoride ions and chloride ions.

Preferably sodium chloride and barium fluoride are used as the sources of alkali metal, barium, fluoride and chloride ions, and preferably these compounds are present in the calcination mixture in such proportions that they constitute respectively 1%–20% and 0.5%–10% by weight of the mixture.

Preferably, the mixture is calcined at a temperature within the range 850 to 1150° C.

A ceramic pigment according to the invention is typically obtained by calcining at approximately 860° C. in an open saggar, a dry mixed composition consisting of 60 g. zirconium oxide, 30 g. silica, 5.5 g. ammonium metavanadate, 2.5 g. barium fluoride and 10 g. sodium chloride. The crushed ground and washed product is a strong blue ceramic pigment.

A prior art pigment, on the other hand, may be prepared by calcining at approximately 860° C. in an open saggar a mixture of 60 g. zirconium oxide, 30 g. silica, 5.5 g. ammonium metavanadate, 5 g. sodium fluoride and 4 g. sodium chloride. The crushed ground and washed calcination product is also a strongly coloured blue ceramic pigment.

In order to illustrate the enhanced colour strength of ceramic pigments in accordance with the invention, samples of a prior art blue pigment and the pigment according to the invention, both prepared as described above, were mixed respectively with samples of a white, zircon opaque glaze maturing at 1070° C., at 2.5%, 5%, 7.5%, and 10% concentrations. The pigmented glaze samples were then applied to and fired on white ceramic tiles.

Reflectance measurements on the glazed tiles in the red (R), green (G), and blue (B) regions of the spectrum were then obtained with a Colormaster differential colorimeter. In each case the average of two reflectance measurements at right angles to each other was taken as the base for subsequent computation of modified Adams Coordinates in an attempt to eliminate directional effects due to surface defects.

The reflectance measurements R, G, and B together with the modified Adams Coordinates L, $a$ and $b$, derived from them are tabulated below.

|       |   | VZr 122 10% | VZr 121 10% | VZr 122 7.5% | VZr 121 7.5% |
|-------|---|-------------|-------------|--------------|--------------|
| 1---  | G | 34.07       | 40.01       | 37.75        | 43.90        |
| 2---  | R | 25.93       | 30.83       | 29.11        | 34.93        |
| 3---  | B | 54.08       | 62.28       | 57.67        | 64.82        |
|       | L | 63.32       | 67.85       | 65.78        | 70.07        |
|       | $a$ | −8.6      | −8.0        | −8.6         | −11.3        |
|       | $b$ | −23       | −23.3       | −22.0        | −21.2        |

In both the above and the following tables, reference 121 designates the prior art pigment and reference 122 designates the pigment according to the invention.

|       |   | VZr 122 5% | VZr 121 5% | VZr 122 2.5% | VZr 121 2.5% |
|-------|---|------------|------------|--------------|--------------|
| 1---  | G | 43.36      | 48.96      | 53.16        | 58.95        |
| 2---  | R | 35.1       | 40.60      | 45.50        | 51.54        |
| 3---  | B | 62.17      | 67.96      | 69.15        | 73.41        |
|       | L | 70.21      | 73.92      | 76.52        | 79.92        |
|       | $a$ | −8.4     | −8.0       | −10.1        | −7.4         |
|       | $b$ | −19.3    | −18.1      | −14.8        | −12.7        |

The Adams coordinate (L) represents the lightness value of the glaze colour on a scale ranging from black to white, the coordinate $a$ represents the redness or greenness of the sample, positive values if $a$ signifying redness and negative values greenness whereas the coordinate $b$ represents the blueness or yellowness of the sample. In this case positive values signify yellowness and negative values blueness. The units in each case are N.B.S. units where 0.3 N.B.S. units is the minimum difference in tone or strength detectable by a trained observer.

Inspection of the lightness values shows that in each case the L values of coloured glazes containing the prior art pigment are greater than corresponding L values for those containing the new material, i.e. the pigment prepared according to the invention is stronger than the prior art pigment.

This conclusion is confirmed in FIG. 1 which shows a plot of the lightness values against the blueness values of the coloured glazes containing on the one hand the pigment according to the invention and on the other hand the prior art pigment. It may be seen that the pigments prepared according to the invention and the prior art are of slightly different hue. The difference in hue decreases with increasing pigment concentration, the trials containing 10% of the pigment being nearly a perfect match for hue. At point X glaze trials containing the new and prior art pigments have the same L and $b$ values and the colours would have been a perfect match had the $a$ values differed by less than 0.3 N.B.S. units. It is evident, however, that at point X a coloured glaze, containing only about 1.9% of the pigment according to the invention would match, in strength, a glaze containing about 2.8% of the prior art pigment. Thus the new pigment is approximately 50% stronger than the prior art material. Similar results are obtained by comparison of compositions with the same L value.

The colorimeter measurements were confirmed by the spectral reflectance measurement shown in FIG. 2. The drawing is a colour comparison between zircon vanadium blue pigments prepared according to this invention and the prior art. The curves were produced by a UNICAM SP500 spectrophotometer from samples containing 10% of the pigment in the zircon opaque glaze on the white ceramic tiles used in the colorimeter measurements.

The curves are representative of the colour of the two samples recorded in terms of percentage reflectance against wavelength. It should be noted that the reflectance of the sample containing the new pigment is lower at all wavelenghs than the sample containing the prior art pigment. That is, the new pigment has a greater tinctorial strength than the prior art pigment.

Another ceramic pigment according to the invention is typically obtained by calcining at 960° C. in a closed saggar, a dry mixed composition consisting of 60 g. zirconium oxide; 30 g. silica; 10 g. praseodymium oxylate $(Pr_2(C_2O_4)_3 \cdot 10H_2O)$; 5 g. barium fluoride; 10 g. sodium chloride. The crushed ground and washed product is a strong yellow pigment.

What I claim is:

1. In a method of making a zirconium silicate ceramic pigment which comprises calcining a mixture containing (a) a member of the group consisting of zirconium oxide and compounds capable of yielding such oxide on calcination; (b) a member of the group consisting of silicon oxide and compounds capable of yielding such oxide on calcination; components (a) and (b) being present in amounts such that zirconium silicate is formed on calcination; (c) an effective amount of a chromophore selected from the group consisting of vanadium pentoxide, praseodymium oxide and compounds capable of yielding such oxide on calcination; and (d) an effective amount of a mineralizer component comprising an alkali metal halide, the improvement which comprises utilizing as the mineralizer component (d), alkali metal and barium halides selected from the group consisting of the chlorides, bromides and fluorides, said mineralizer component including a fluoride, and at least one of the other indicated halides.

2. A method according to claim 1 wherein chromophore is vanadium pentoxide or a compound capable on calcination of yielding vanadium pentoxide.

3. A method according to claim 2 wherein the said compound is sodium metavanadate.

4. A method according to claim 2 wherein the said compound is ammonium metavanadate.

5. A method according to claim 1 wherein the chromophore is praseodymium oxide or a compound capable on calcination of yielding praseodymium oxide.

6. A method according to claim 5 wherein the said compound is praseodymium oxylate.

7. A method according to claim 1 wherein the mineralizer component comprises sodium chloride and barium fluoride.

8. A method according to claim 7 wherein sodium chloride and barium fluoride are present in the calcination mixture in such proportions that they constitute respectively 1–20% and 0.5–10% by weight of the mixture.

9. A method according to claim 1 wherein the mixture is calcined at a temperature within the range 850–1150° C.

10. A zirconium silicate ceramic pigment comprising the calcined product of a mixture of (a) zirconium oxide, (b) silicon oxide, components (a) and (b) being present in amounts such that zirconium silicate is formed on calcination, (c) an effective amount of a chromophore selected from the group consisting of vanadium pentoxide and praseodymium oxide and (d) an effective amount of a mineralizer component comprising alkali metal and barium halides selected from the group consisting of the chlorides, bromides and fluorides, said mineralizer component including a fluoride and at least one of the other indicated halides.

11. A composition for preparing a zirconium silicate pigment by calcining, said composition comprising a mixture containing (a) a member of the group consisting of zirconium oxide and compounds capable of yielding such oxide on calcination; (b) a member of the group consisting of silicon oxide and compounds capable of yielding such oxide on calcination; components (a) and (b) being present in amounts such that zirconium silicate is formed on calcination; (c) an effective amount of a chromophore selected from the group consisting of vanadium pentoxide, praseodymium oxide and compounds capable of yielding such oxide on calcination; and (d) an effective amount of a mineralizer component comprising alkali metal and barium halides selected from the group consisting of the chlorides, bromides and fluorides, said mineralizer component including a fluoride, and at least one of the other indicated halides.

References Cited

UNITED STATES PATENTS

| | | | |
|---|---|---|---|
| 3,171,753 | 3/1965 | Olby | 106—299 |
| 3,189,475 | 6/1965 | Marquis et al. | 106—299 |
| 3,257,221 | 6/1966 | Olby | 106—299 |
| 3,012,898 | 12/1961 | Seabright | 106—299 |
| 3,168,410 | 2/1965 | Bruneau | 106—299 |

FOREIGN PATENTS

| | | | |
|---|---|---|---|
| 1,430,485 | 1/1966 | France | 106—299 |

JAMES E. POER, Primary Examiner